(12) United States Patent
O'Neal

(10) Patent No.: US 9,776,560 B1
(45) Date of Patent: Oct. 3, 2017

(54) VEHICLE COMPONENT INCLUDING A LIGHTING SYSTEM

(71) Applicant: Nissan North America, Inc., Franklin, TN (US)

(72) Inventor: Kenneth Brian O'Neal, Farmington Hills, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 0 days.

(21) Appl. No.: 15/078,414

(22) Filed: Mar. 23, 2016

(51) Int. Cl.
*B60Q 3/00* (2017.01)
*H05B 37/02* (2006.01)

(52) U.S. Cl.
CPC ......... *B60Q 3/007* (2013.01); *H05B 37/0218* (2013.01)

(58) Field of Classification Search
CPC ... H05B 33/0869; H05B 33/0872; H05B 37/02; H05B 37/0227; B60R 11/02; H04B 1/082; B60Q 2500/00; B60Q 2500/10; B60Q 2900/30
USPC ........... 315/77, 82, 149, 158, 297, 307, 312; 362/487, 488
See application file for complete search history.

(56) References Cited

U.S. PATENT DOCUMENTS

| | | | | |
|---|---|---|---|---|
| 7,164,117 B2* | 1/2007 | Breed | ............... | B60R 21/01516 250/208.1 |
| 7,604,382 B2* | 10/2009 | Ohira | ................... | B62K 19/30 362/473 |
| 7,733,659 B2* | 6/2010 | Snider | .................... | H04B 1/082 29/830 |
| 9,526,150 B1* | 12/2016 | Guan | .................. | H05B 37/0227 |
| 2010/0014711 A1* | 1/2010 | Camhi | .................... | B60K 28/06 382/104 |

\* cited by examiner

*Primary Examiner* — Haissa Philogene
(74) *Attorney, Agent, or Firm* — Global IP Couselors, LLP

(57) ABSTRACT

A vehicle component includes a housing, a faceplate, an electrical device a photosensor, and a lighting system. The faceplate is attached to the housing, and has a first opening and a second opening. The electrical device is at least partially disposed within the housing so as to be accessible through the first opening, and having an electrical connection configured to receive electrical power from an electrical power supply. The photosensor is at least partially disposed within the housing and within the second opening. The lighting system is configured to be activated by the photosensor and powered by the electrical power supply of the electrical device.

17 Claims, 4 Drawing Sheets

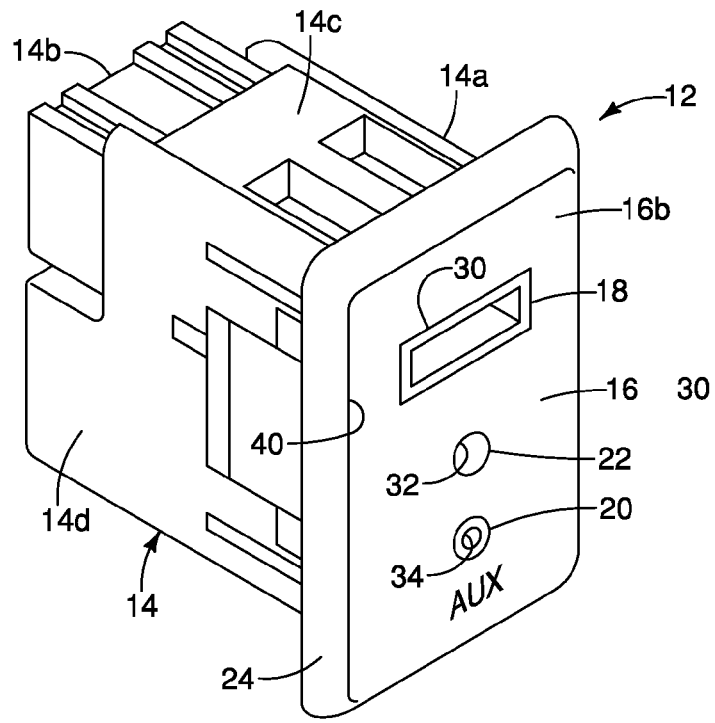
FIG. 2
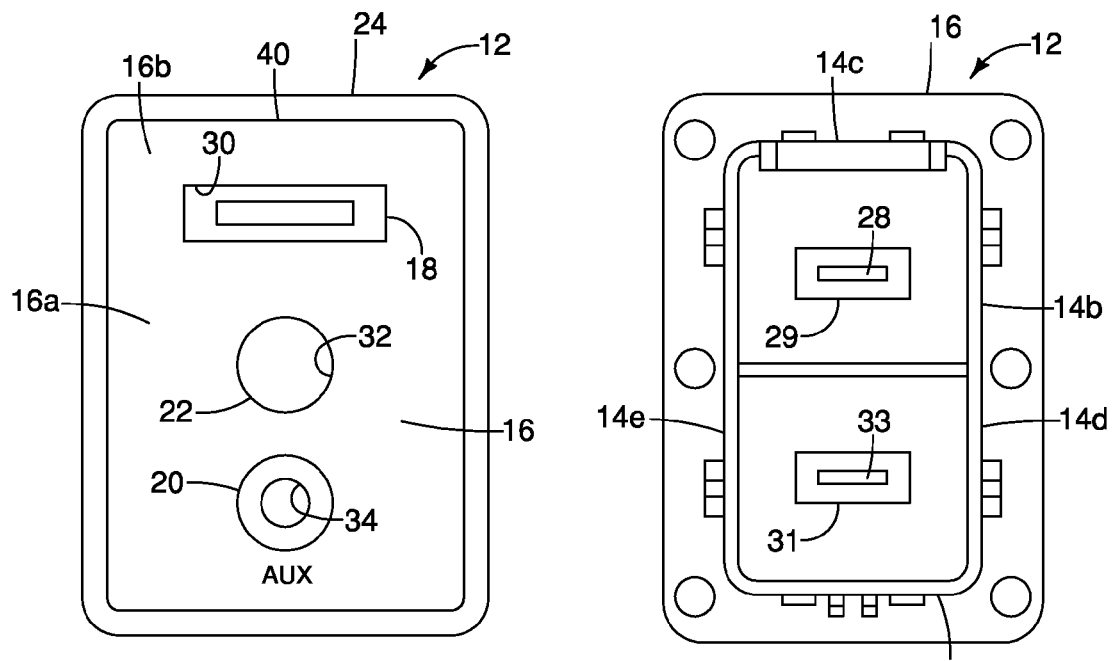
FIG. 3
FIG. 4

VEHICLE COMPONENT INCLUDING A LIGHTING SYSTEM

BACKGROUND

Field of the Invention

The present invention generally relates to a vehicle component that includes a lighting system. More specifically, the present invention relates to a vehicle component that includes a two stage lighting system for ease of use.

Background Information

Conventional vehicles include many components. For example, many vehicles now include USB connections and auxiliary jacks for audio. These components can be placed in various positions around the vehicle. That is, in some vehicles these components are disposed in the rear seating area, the center console and the instrument panel.

SUMMARY

It has been discovered that based on the positioning of the vehicle components, the components can be difficult to use based on the ambient light. In other words, when it is night, the component can be difficult to locate and properly use. In view of the state of the known technology, one aspect of the present disclosure is to provide a vehicle component including a housing, a faceplate, an electrical device, a photosensor, and a lighting system. The faceplate is attached to the housing, and has a first opening and a second opening. The electrical device is at least partially disposed within the housing so as to be accessible through the first opening, and having an electrical power supply. The photosensor is at least partially disposed within the housing and within the second opening. The lighting system is configured to be activated by the photosensor and powered by the electrical power supply of the electrical device.

Another aspect of the present disclosure is to provide a method of providing light to a vehicle component. The method includes powering an electrical device via an electrical power supply, the electrical device being at least partially disposed within a housing, and being accessible through a first opening in the housing, sensing a level of ambient light using a photosensor, the photosensor being at least partially disposed within a second opening of the housing, powering a lighting system using the electrical power supply of the electrical device, and based on the level of ambient light sensed by the photosensor, activating a lighting system.

Another aspect of the present disclosure is to provide a vehicle component including a housing, a faceplate, an electrical device, a photosensor, and a lighting system. The faceplate is attached to the housing, and has a first opening and a second opening. The electrical device is at least partially disposed within the housing so as to accessible through the first opening. The photosensor is at least partially disposed within the housing and within the second opening. The lighting system is configured to be activated by the photosensor and configured to provide a first level of illumination and a second level of illumination, the first level of illumination being different from the level of second illumination, each of the first and second levels of illumination being greater than zero.

BRIEF DESCRIPTION OF THE DRAWINGS

Referring now to the attached drawings which form a part of this original disclosure:

FIG. 2 is a top perspective view of the vehicle component shown in FIG. 1;

FIG. 3 is a front view of the vehicle component shown in FIG. 2;

FIG. 4 is a rear view of the vehicle component shown in FIG. 2;

DETAILED DESCRIPTION OF EMBODIMENTS

Figure 1:
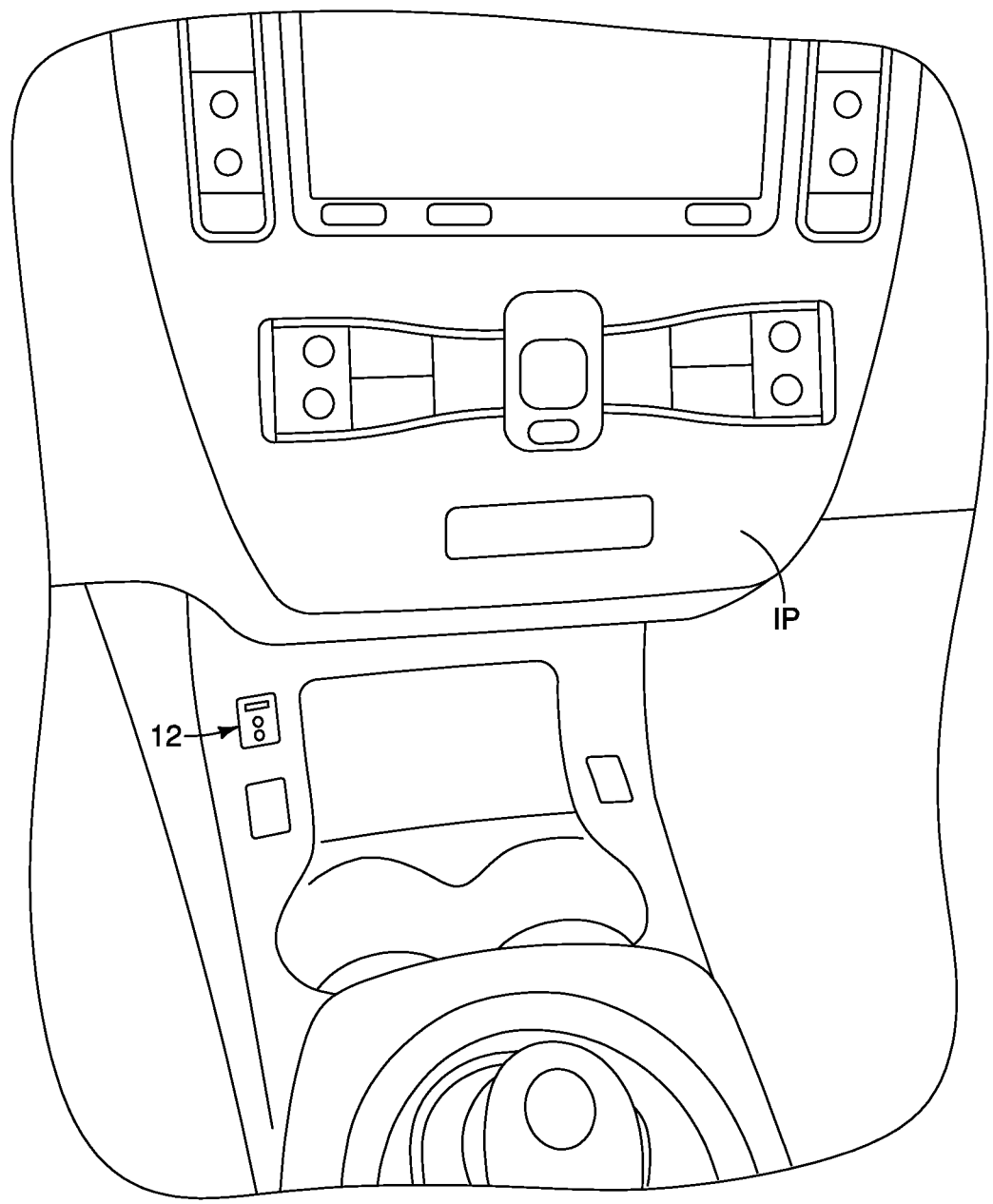
FIG. 1 is a partial view of the interior of a vehicle with a vehicle component in accordance with one embodiment disposed thereon.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4 and 6, a vehicle component 12 is illustrated in accordance with a first embodiment. The vehicle component 12 is generally disposed in the interior of vehicle. For example, the vehicle component 12 can be disposed in one the instrument panel (IP), or inside of a central arm rest compartment, in the rear seat area, or any other suitable place. In one embodiment, the vehicle component 12 includes a housing 14, a faceplate 16, a first electrical device 18, a second electrical device 20, a photosensor 22, a lighting system (illumination device) 24 and a controller (control device) 26.

The controller 26 can be an electrical control device or electrical circuitry that switches the controls the flow of electrical current through an electrical circuit so as to alter or change the current level passing through the lighting system 24. Alternatively, the controller 26 can be a microcomputer with a control program that controls the vehicle component 12 as discussed below. In this embodiment, the controller 26 can also include other conventional components such as an input interface circuit, an output interface circuit, and storage devices such as a ROM (Read Only Memory) device and a RAM (Random Access Memory) device. The microcomputer of the controller 26 is programmed to control the lighting system 24. The memory circuit stores processing results and control programs such as ones for the lighting system 24 operation that are run by the processor circuit. The controller 26 is operatively coupled to the lighting system 24 and photosensor 22 in a conventional manner. The internal RAM of the controller 26 stores statuses of operational flags and various control data. The controller 26 is capable of selectively controlling any of the components in accordance with the control program. It will be apparent to those skilled in the art from this disclosure that the precise structure and algorithms for the controller 26 can be any combination of hardware and software that will carry out the functions of the present invention.

The housing 14 is generally a rectangular housing 14 formed from a polymer (plastic) material. The housing 14 includes a front portion 14a, a rear portion 14b, a top portion 14c, side portions 14d and 14e, and a bottom portion 14f. Preferably the housing 14 is sized and configured to fit within an opening in the instrument panel IP or in another opening in the interior of a vehicle. Moreover, the housing 14 preferably contains the first electrical device 18, the second electrical device 20, the photosensor 22, the controller 26 and electrical circuitry, including contacts 28, to enable the electrical device 18 to be powered by a power supply PS. The rear portion 14b of the housing 14 includes an opening 29 to enable a power supply PS to couple to the electrical device 18 (via the contacts 28) disposed in the housing 14. The rear portion 14b of the housing 14 also includes an opening 31 to enable a power supply PS to couple to the electrical device 20 (via contacts 33) disposed in the housing 14. However, it is noted that the power supply PS can couple to only one contact or set of contacts to enable the power supply to power the first and second electrical devices 18 and 20. Additionally, the housing 14 can include coupling members (not shown) that enable the housing 14 to attach or couple to an interior portion of the vehicle. The housing 14 can contain any suitable devices or number of devices and is not limited to the components illustrated herein.

As shown in FIGS. 2 and 3, the faceplate 16 is attached to the housing 14, and has a first opening 30, a second opening 32, and a third opening 34. Preferably, the faceplate 16 is formed from a polymer (plastic) material similar to the housing 14, but can be formed from any suitable material. The first opening 30 is sized and configured to enable access to the electrical device 18 therethrough. In one embodiment, the first opening 30 is generally rectangular. The second opening 32 is generally sized and configured to enable at least a portion of the photosensor 22 to extend therethrough. In one embodiment, the second opening 32 is generally circular. The third opening 34 is generally sized and configured to enable access to a second electrical device 20 therethrough. In one embodiment, the second opening 34 is generally circular. Moreover, the faceplate 16 can have indicia thereon to indicate the type of electrical device 18 accessible through the faceplate 16.

The first electrical device 18 is generally rectangular and is at least partially disposed within the housing 14 so as to be accessible through the first opening 30. As shown in FIGS. 2 and 3, the electrical device 18 is preferably a Universal Serial Bus (USB) device configured to have an electrical connector or device inserted thereinto. The electrical device 18 can have an electrical contact (connection) 28 configured to receive electrical power from an electrical power supply PS. As illustrated in FIG. 4, the electrical connection 28 is disposed on the rear portion 12b of the housing 14.

The second electrical device 20 is generally circular and is at least partially disposed within the housing 14 so as to be accessible through the third opening 34. As shown in FIGS. 2 and 3, the second electrical device 20 is preferably an auxiliary (AUX) jack. In other words, the second electrical device 20 can be an audio input jack for an audio device. The second electrical device 20 can have an electrical contact (connection) 33 configured to receive electrical power from an electrical power supply PS. As illustrated in FIG. 4, the electrical contact 33 is disposed on the rear portion 12b of the housing 14. It is noted that the first and second electrical devices 18 and 20 can be any suitable devices. Moreover, there can be any suitable number or type of electrical devices, including but not limited to one, two or more devices. For example, the vehicle component 12 can include one or a plurality of USB devices, one or a plurality of SD card slots, one or a plurality of RCA connections, or any suitable type or combination of types of electrical devices or jacks.

The photosensor 22 is generally circular (or domed shaped) and is at least partially disposed within the housing 14 and within the second opening 32. The photosensor 22 extends at least partially out of the opening 32 so as to be capable of detecting ambient light from a plurality of directions. In one embodiment, the photosensor 22 is disposed generally in the central portion 16a of the faceplate 16, but may be disposed in any suitable position near the lighting system 24. The photosensor 22 can be a photo electric sensor that contains optics and electrical circuitry, and can be powered by the same electrical power from the electrical power supply PS that powers the first and second electrical devices 18 and 20. Additionally, the photosensor 22 can be a photodiode, i.e., a semiconductor device that converts light into current. In other words, the photosensor 22 can be any device or structure configured to detect the ambient light level from an area adjacent the photosensor 22 and send a signal to a control device (controller 26) that enables the lighting system 24 to alter intensity based on the ambient light level.

The lighting system 24 is preferably LED lighting and is disposed around the periphery 16b of the faceplate 16. As illustrated in FIG. 2, the lighting system 24 completely or substantially completely extends along the outer edge 40 of the faceplate 16 in a rectangular configuration to illuminate or light up the faceplate 16 and/or the entire area adjacent the faceplate 16. The lighting system 24 is configured to be activated or powered by the electrical power supply PS of the electrical device 18. Moreover, the intensity level of the lighting system 24 can be controlled by the photosensor 22. It is noted that the lighting system 24 can be any suitable lighting system 24 and disposed in a suitable position relative to the faceplate 16 and housing 14.

Accordingly, the lighting system 24 is capable of lighting the area near the electrical device 18 to enable a user to properly connect to the electrical device 18.

Figure 5:
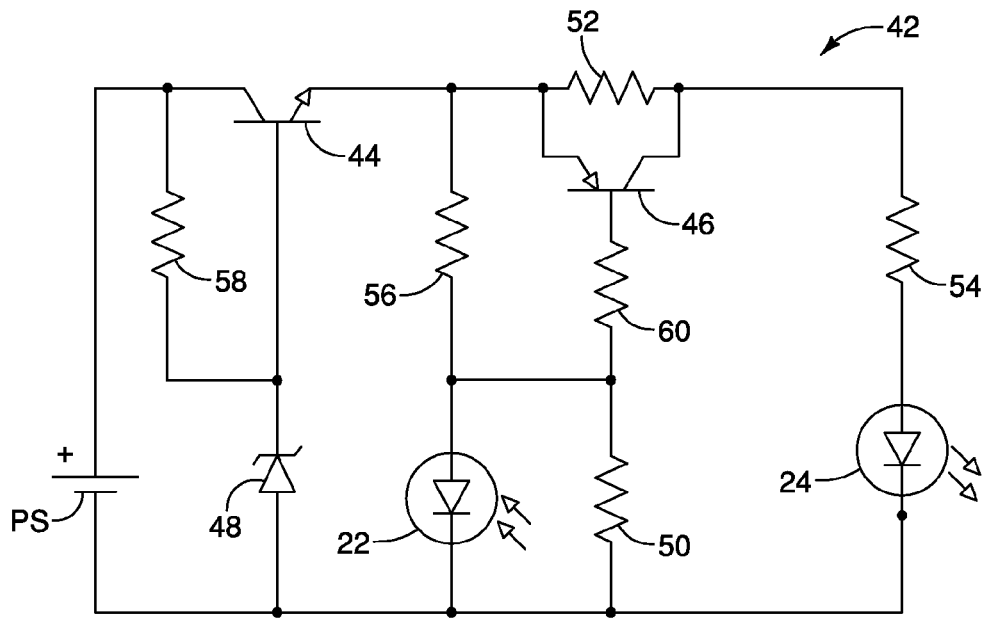
FIG. 5 is an electric circuit diagram illustrating the operation of the electrical components of the vehicle component shown in FIG. 2.
Figure 6:
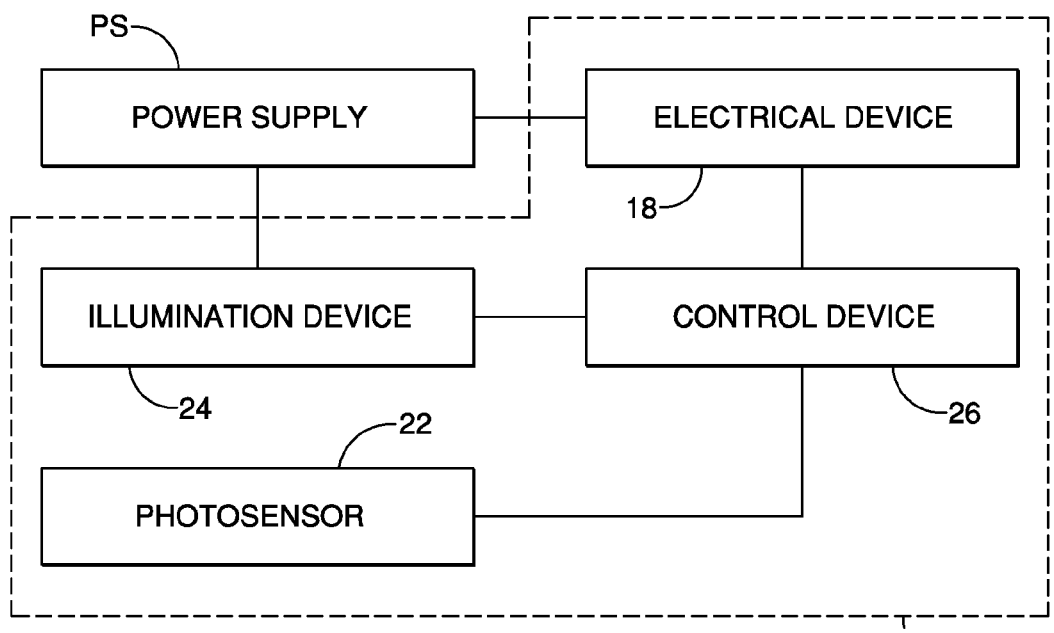
FIG. 6 is a schematic of the vehicle component shown in FIG. 1.

FIG. 5 illustrates one embodiment of an electrical circuit 42 for the vehicle component 12. In this embodiment, the circuit includes a battery or power source PS, a NPN bipolar junction transistor (voltage regulator) 44, a PNP bipolar junction transistor (voltage regulator) 46, diode 48, photosensor 22, the lighting system 24 (e.g., a LED) and resistors 50-60. The battery or power source PS can be the power source that operates the electrical device 18, such as the vehicle battery. When the ambient light level is below a predetermined amount (e.g., night) and at a first level of ambient light, the photosensor 22 is not activated (enters night mode), causing the current flow to travel from the bipolar junction transistor (voltage regulator) 44 through resistors 52 and 54 to the lighting system 24. The sum of resistors 52 and 54 limit the current through the lighting system 24 to establish a first predetermined brightness level (illumination level), or a low brightness level.

When the ambient light level is above the predetermined amount (e.g., day) and at a second level of ambient light, the photosensor 22 is activated (enters day mode). That is, the photosensor is capable of determining that the ambient light level is above a predetermined amount. In this embodiment, the photosensor 22 is biased on, which in turn biases on the bipolar junction transistor 46. When the bipolar junction transistor 46 is biased on, the current flow is through the bipolar junction transistor 46 parallel to 52. Accordingly, the current bypasses resistor 52 and the resistance of resistor 52 is negated. So current flow is increased through the bipolar junction transistor 46 and resistor 54 through the lighting system 24 to establish a second predetermined brightness level (illumination level), or a high brightness level. Thus, the second predetermined brightness (day mode) is higher than the first predetermined brightness (night mode). In one embodiment, the first predetermined brightness and the second predetermined brightness are both "on" illumination levels. That is, both the first predetermined brightness and the second predetermined brightness are greater than zero. Moreover, in one embodiment, in day mode the brightness can be off if desired. Thus, in this embodiment, the second predetermined brightness (day mode) is lower (i.e., off) than the first predetermined brightness (night mode).

Accordingly, in one embodiment, the controller 26 can be a simple electrical circuitry that causes a change in current flow based on the ambient light determined by the photosensor. For example, in the circuit diagram illustrated in FIG. 5, the flow of electrical current is changed when photosensor 22 senses or determines a certain or predetermined level of light. Photosensor 22 is biased on, which in turn biases on bipolar junction transistor 46. These elements thus alter or change the flow of current to bypass the resistor 52.

Figure 7:
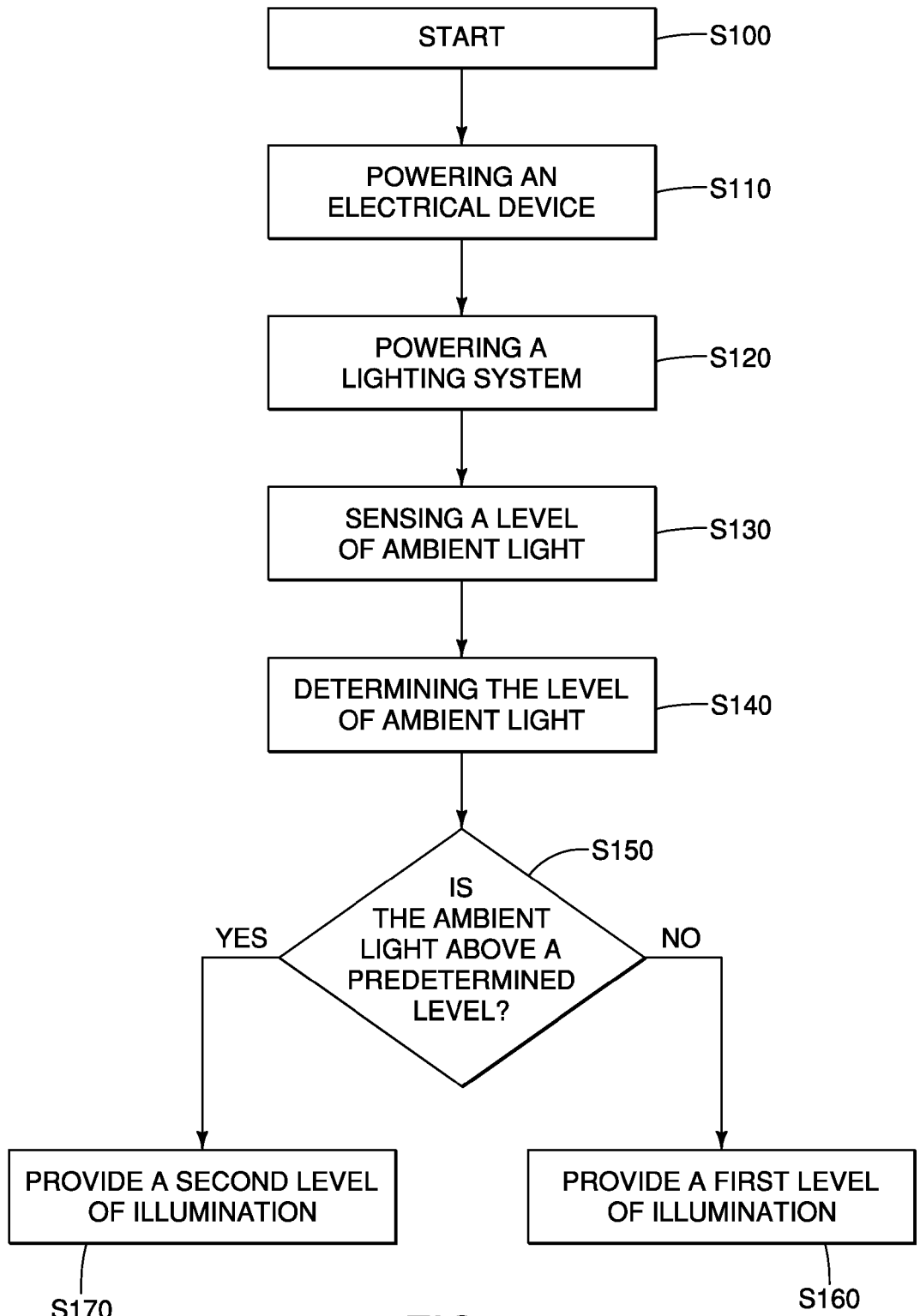
FIG. 7 is a flow chart illustrating the method of determining the illumination level if the vehicle component shown in FIG. 1.

Turning to FIG. 7, a method of providing two stage light or illumination to a vehicle component 12 is illustrated. In step S100 the method is started. Is step S110, an electrical device (e.g., electrical device 18) is powered using a power source PS. It is noted that multiple electrical devices can be powered using the power source or additional power sources. In step S120, a lighting system 24 is powered using the same power source as the electrical device 18. In the step S130 a photosensor detects or senses the ambient light of an area adjacent the electrical device 18. In S140, a determination is made of the level of the ambient light in the area adjacent the electrical device 18. In step S150, the level of ambient light is compared to a predetermined level. If the ambient is above the predetermined level, the lighting system 24 provides a first level of illumination in step S160. However, if the ambient is not above the predetermined level, the lighting system 24 provides a second level of illumination in step S160. The process can be repeated an a continuous basis to determine whether the illumination level needs to be altered or changed.

The first electrical device, the second electrical device and the photosensor can be conventional components that are well known in the art. Since these elements can be well known in the art, these structures will not be discussed or illustrated in further detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "section," "portion," "member" or "element" when used in the singular can have the dual meaning of a single part or a plurality of parts. Also as used herein to describe the above embodiment(s), the following directional terms "front" and "rear", as well as any other similar directional terms refer to those directions of a vehicle equipped with the vehicle component including a lighting system 24. Accordingly, these terms, as utilized to describe the present invention should be interpreted relative to a vehicle equipped with the vehicle component including a lighting system 24.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature, which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle component, comprising:
    a housing;
    a faceplate attached to the housing, and having a first opening and a second opening;
    an electrical device at least partially disposed within the housing so as to be accessible through the first opening, and having an electrical connection configured to receive electrical power from an electrical power supply;
    a photosensor at least partially disposed within the housing and within the second opening; and
    a lighting system configured to be activated by the photosensor and powered by the electrical power supply of the electrical device, the lighting system extending along an outer edge and configured to illuminate at least one of the faceplate and an area adjacent the faceplate.

2. The vehicle component according to claim 1, wherein the lighting system is disposed around a periphery of the faceplate.

3. The vehicle component according to claim 1, wherein the electrical device is one of a USB port, and an auxiliary jack.

4. The vehicle component according to claim 1, further comprising
a control device configured to receive a signal from the photosensor to change an illumination level of the lighting system.

5. The vehicle component according to claim 1, wherein
the lighting system is configured to provide a first level of illumination and a second level of illumination, the first level of illumination being different from the level of second illumination, each of the first and second levels of illumination being greater than zero.

6. The vehicle component according to claim 1, wherein
the photosensor is configured to sense a first level of ambient light and a second level of ambient light, and when the first level of ambient light is sensed the lighting system provides the first level of illumination, and when the second level of ambient light is sensed the lighting system provides the second level of illumination.

7. A method of providing light to a vehicle component, the method comprising:
powering an electrical device via an electrical power supply, the electrical device being at least partially disposed within a housing, and being accessible through a first opening in the housing;
sensing a level of ambient light using a photosensor, the photosensor being at least partially disposed within a second opening of the housing;
powering a lighting system using the electrical power supply of the electrical device, the lighting system extending along an outer edge of a faceplate of the electrical device and configured to illuminate at least one of the faceplate and an area adjacent the faceplate; and
based on the level of ambient light sensed by the photosensor, activating the lighting system to illuminate one of a first level of illumination and a second level of illumination.

8. The method according to claim 7, wherein
the lighting system is disposed around a periphery of the faceplate.

9. The method according to claim 7, wherein
the electrical device is one of a USB port, and an auxiliary jack.

10. The method according to claim 7, further comprising
transmitting a signal from the photosensor to a control device, such that the control device alters the one the first level of illumination and the second level of illumination.

11. The method according to claim 7, wherein
providing a first level of illumination using the lighting system based on a first condition and providing a second level of illumination using the lighting system based on a second condition, the first level of illumination being different from the level of second illumination, each of the first and second levels of illumination being greater than zero.

12. The method according to claim 11, wherein
the level of ambient light sensed by the photosensor is a first level of ambient light, and further sensing a second level of ambient light, and when the first level of ambient light is sensed, providing the first level of illumination using the lighting system, and when the second level of ambient light is sensed, providing the second level of illumination using the lighting system.

13. A vehicle component, comprising:
a housing;
a faceplate attached to the housing, the faceplate having a first opening and a second opening;
an electrical device at least partially disposed within the housing so as to accessible through the first opening;
a photosensor at least partially disposed within the housing and within the second opening; and
a lighting system configured to be activated by the photosensor and configured to provide a first level of illumination and a second level of illumination, the first level of illumination being different from the level of second illumination, each of the first and second levels of illumination being greater than zero, the lighting system extending along an outer edge of the faceplate and configured to illuminate at least one of the faceplate and an area adjacent the faceplate.

14. The vehicle component according to claim 13, wherein
the lighting system is disposed around a periphery of the faceplate.

15. The vehicle component according to claim 13, wherein
the electrical device is one of a USB port, and an auxiliary jack.

16. The vehicle component according to claim 13, further comprising
a control device configured to receive a signal from the photosensor to change an illumination level of the lighting system.

17. The vehicle component according to claim 13, wherein
the photosensor is configured to sense a first level of ambient light and a second level of ambient light, and when the first level of ambient light is sensed the lighting system provides the first level of illumination, and when the second level of ambient light is sensed the lighting system provides the second level of illumination.

* * * * *